United States Patent
Ottosson et al.

(10) Patent No.: US 6,665,288 B1
(45) Date of Patent: Dec. 16, 2003

(54) METHOD AND APPARATUS FOR REDUCING SYNCHRONIZATION CODE INTERFERENCE IN CDMA COMMUNICATIONS SYSTEMS

(75) Inventors: Tony Ottosson, Gothenburg (SE); Yi-Pin Eric Wang, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/436,788

(22) Filed: Nov. 8, 1999

(51) Int. Cl.[7] .............................................. H04B 7/216
(52) U.S. Cl. ........................ 370/342; 370/280; 370/324; 370/350
(58) Field of Search ................................ 370/277, 280, 370/294, 320, 324, 342, 350

(56) References Cited

U.S. PATENT DOCUMENTS

| | | | | |
|---|---|---|---|---|
| 4,754,453 A | * | 6/1988 | Eizenhofer | 370/337 |
| 5,579,304 A | * | 11/1996 | Sugimoto et al. | 370/342 |
| 5,835,489 A | | 11/1998 | Moriya et al. | 370/342 |
| 6,097,714 A | * | 8/2000 | Nagatani et al. | 370/342 |
| 6,301,289 B1 | * | 10/2001 | Bejjani et al. | 375/144 |
| 6,356,555 B1 | * | 3/2002 | Rakib et al. | 370/441 |
| 6,385,264 B1 | * | 5/2002 | Terasawa et al. | 375/371 |
| 6,404,758 B1 | * | 6/2002 | Wang | 370/342 |
| 6,480,558 B1 | * | 11/2002 | Ottosson et al. | 375/350 |

FOREIGN PATENT DOCUMENTS

| | | |
|---|---|---|
| EP | 0 795 969 A2 | 9/1997 |
| WO | WO 98/18217 | 4/1998 |
| WO | WO 98/43362 | 10/1998 |

OTHER PUBLICATIONS

Form PCT/ISA/206 (Invitation to Pay Additional Fees) and Annex (Communication Relating to the Results of the Partial International Search), PCT/US00/26676, Feb. 5, 2001.

Nyström et al., "Comparison of Cell Search Methods for Asynchronous Wideband CDMA Cellular System," International Conference on Universal Personal Communications, IEEE, New York, NY, US, vol. 2, Oct. 5, 1998, pp. 783–787.

(List continued on next page.)

*Primary Examiner*—Hassan Kizou
*Assistant Examiner*—D Levitan
(74) *Attorney, Agent, or Firm*—Myers Bigel Sibley & Sajovec

(57) ABSTRACT

In a code division multiple access (CDMA) communications system, a synchronization code is transmitted on a first channel. Information is selectively communicated on a second channel, e.g., a dedicated physical channel, to limit interference attributable to the synchronization code in a signal received over the second channel. In one embodiment, a slot configuration used on the second channel reduces the likelihood of time-coincidence of the synchronization code with information transmitted on the second channel having a higher level of sensitivity to interference, such as transmit power control (TPC) commands or pilot symbols. According to another aspect, interference associated with a synchronization code is canceled from signal received on the second channel to recover information originally transmitted on the second channel. In one embodiment, an estimate of a component of the received signal associated with the synchronization code is generated from the synchronization code and a channel estimate. The estimate of the interference component is canceled from the received signal to generate an interference-canceled version of the received signal, which is then processed to recover information originally transmitted on the second channel.

27 Claims, 9 Drawing Sheets

OTHER PUBLICATIONS

International Search Report, PCT/US00/26676, Jul. 31, 2001.

Östberg et al., "Performance and Complexity of Techniques for Achieving Fast Sector Identification in an Asynchronous CDMA System," Proceedings of the 1998 Wireless Multimedia Conference, Japan, Nov. 1998, 6 pages.

Vol. 3, "Specifications of Air–Interface for 3G Mobile System," Ver. 1.0, Association of Radio Industries and Businesses (ARIB), Jan. 14, 1999, pp. 70–127.

Adachi et al., "Wideband DS–CDMA for Next–Generation Mobile Communications Systems," IEEE Communications Magazine, Sep. 1998, pp. 56–69.

Dahlman et al., "UMS/IMT–2000 Based on Wideband CDMA," IEEE Communications Magazine, Sep. 1998, pp. 70–80.

TS 25.211 V2.4.0 (Sep. 1999), Technical Specification, $3^{rd}$ Generation Partnership Project (3GPP); Technical Specification Group (TSG) Radio Access Network (RAN); Working Group 1 (WG1); Physical channels and mapping of transport channels onto physical channels (FDD), 35 pgs.

* cited by examiner

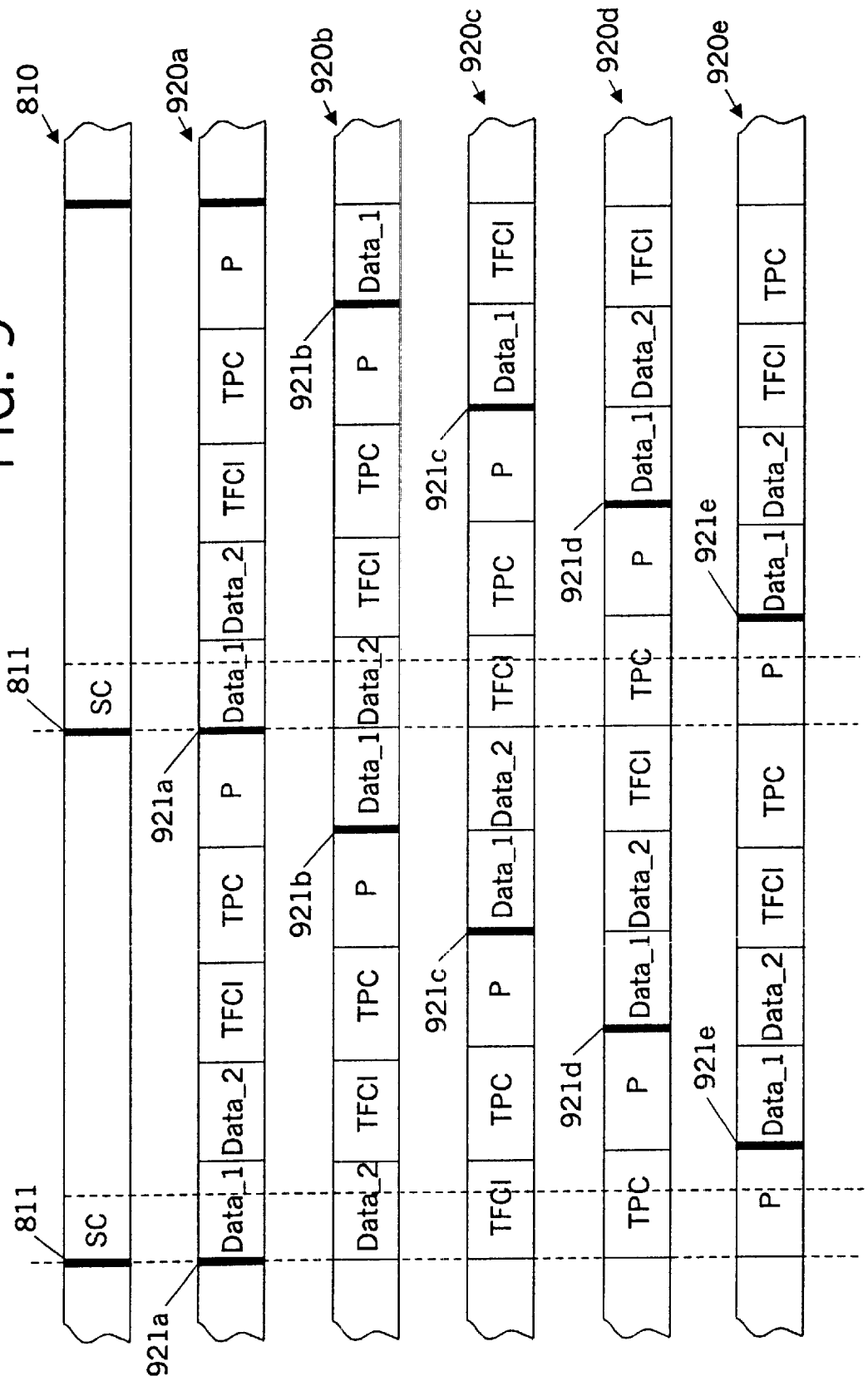

METHOD AND APPARATUS FOR REDUCING SYNCHRONIZATION CODE INTERFERENCE IN CDMA COMMUNICATIONS SYSTEMS

FIELD OF THE INVENTION

The present invention relates to communications systems and methods, and more particularly, to code division multiple access (CDMA) communications systems and methods of operation thereof.

BACKGROUND OF THE INVENTION

Wireless communications systems are commonly employed to provide voice and data communications to subscribers. For example, analog cellular radiotelephone systems, such as those designated AMPS (Advanced Mobile Phone Service), ETACS (Extended Total Access Communications System), NMT (Nordic Mobile Telephony)-450, and NMT-900, have long been deployed successfully throughout the world. Digital cellular radiotelephone systems, such as those conforming to the North American standard IS-54 and the European standard GSM (Global System for Mobile communications), have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more control channels and one or more traffic channels. A control channel is a channel used for transmitting cell identification, paging and other control information. Traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication for a cell 24. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, while more modern digital wireless systems may use multiple access techniques such as time division multiple access (TDMA) and/or code division multiple access (CDMA) to provide increased spectral efficiency.

CDMA systems, such as those conforming to the IS-95 standard, achieve increased channel capacity by using "spread spectrum" techniques wherein a channel is defined by modulating a data-modulated carrier signal by a unique spreading sequence, i.e., a sequence that spreads an original data-modulated carrier over a wide portion of the frequency spectrum in which the communications system operates. Conventional spread-spectrum CDMA communications systems commonly use "direct sequence" (DS) spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

A direct sequence spread spectrum receiver typically includes a local sequence generator that locally produces a replica of a spreading sequence. This locally generated sequence is used to recover information from a transmitted spread spectrum signal that is modulated according to the same spreading sequence. Before information in a transmitted signal can be recovered, however, the locally generated spreading sequence typically must be synchronized with the spreading sequence that modulates the transmitted signal.

Synchronization of terminals is commonly achieved by transmitting a synchronization signal in each cell that a terminal can acquire to obtain a timing reference for synchronizing its de-spreading operations. For example, in an IS-95 compliant system, a "pilot channel" including a fixed carrier modulated by a known sequence is transmitted in each cell of the system, with a respective timing offset applied in a respective cell. In wideband CDMA systems currently under development, such as in WCDMA systems proposed under the $3^{rd}$ Generation Partnership Project (3GPP), as described in Technical Specification TS 25.213, v2.3.0 (1999-9), available at http://www.3gpp.org, a down-link synchronization channel (SCH) is used to transmit a synchronization (or "search") code at known times to provide synchronization. In the aforementioned WCDMA system, a primary synchronization code (PSC) is transmitted on a primary SCH once every slot, with the same PSC being transmitted in each cell of the system. The PSC can be detected by a terminal and used to aid the terminal in determining slot timing, as described, for example, in "Performance and Complexity of Techniques for Achieving Fast Sector Identification in an Asynchronous CDMA System," by Ostberg et al., published in Proceedings of the 1998 Wireless Multimedia Conference, Japan, November 1998. A respective secondary synchronization code (SSC) is transmitted by a respective cell in parallel with the PSC on a secondary SCH, and identifies which of group of scrambling codes is used by the cell.

These synchronization codes are typically non-orthogonal with respect to the other modulation codes used in the system. Although this can periodically destroys orthogonality among signals and can lead to interference with other channels, it is conventionally assumed that channel coding and bit interleaving can mitigate the effects of such interference.

SUMMARY OF THE INVENTION

The present invention arises from the realization that, although encoded information, such as information in the data fields of slots of a downlink channel, may be somewhat immune to the effects of synchronization code interference, synchronization code interference can introduce error in such coded information, and less highly coded information, such as power control bits or pilot symbols, can be even more easily corrupted by coincidence with transmitted synchronization code symbols. According to embodiments of the present invention, information is transmitted on a first channel according to a synchronization code, such as a primary synchronization code (PSC) or a secondary synchronization code (SSC). Information is selectively communicated on a second channel to reduce interference attributable to the synchronization code in a signal received over the second channel. Interference cancellation techniques may be used at a receiver to cancel interference associated with the synchronization code. Instead of, or in addition to, such interference cancellation techniques, the second channel may be transmitted using an offset slot structure that is aligned with the first channel such that the synchronization code does not coincide with interference-sensitive information such as power control information or pilot symbols transmitted over the second channel. Offset slot boundaries can also be used in conjunction with multiple alternative slot structures to better distribute power commands while reducing coincidence of the synchronization codes and the power control and pilot symbols. In addition, modified demodulation techniques can be used that lessen interference effects for encoded information transmitted over the second channel.

In particular, in a code division multiple access (CDMA) communications system according to an embodiment of the present invention, a synchronization code is transmitted on a first channel. Information is selectively communicated on a second channel, such as a dedicated physical channel, to limit interference attributable to the synchronization code in a signal received over the second channel.

According to one embodiment of the present invention, information of respective levels of sensitivity to interference is transmitted on the second channel. Information is transmitted on the second channel using a slot configuration that reduces the likelihood of time-coincidence of the synchronization code with first information transmitted on the second channel having a higher level of sensitivity to interference, such as transmit power control (TPC) information or pilot symbols, in comparison to second information transmitted on the second channel. For example, information may be transmitted on the second channel using a slot boundary offset that is selected to reduce the likelihood of time-coincidence of the synchronization code with the first information.

According to another embodiment of the present invention, a signal including the second channel is received. Interference associated with the synchronization code is canceled from the received signal to recover information originally transmitted on the second channel. An estimate of a component of the received signal associated with the synchronization code may be generated based on a channel estimate and knowledge of the synchronization code, and canceled from the received signal to generate an interference-canceled version of the received signal. The interference-canceled version of the received signal may then be processed to recover information originally transmitted on the second channel.

According to another aspect of the present invention, a code division multiple access (CDMA) communications system includes a base transceiver station (BTS) operative to transmit a synchronization code on a first channel and to transmit information on a second channel using a slot configuration that reduces the likelihood of time-coincidence of the synchronization code with first information transmitted on the second channel having a higher level of sensitivity to interference in comparison to second information transmitted on the second channel. In one embodiment of the present invention, the BTS is operative to transmit on a second channel using a slot boundary offset that reduces the likelihood of time-coincidence of the synchronization code with the first information.

According to another aspect of the present invention, a code division multiple access (CDMA) terminal includes a synchronization code interference canceling receiver operative to cancel interference attributable to a synchronization code transmitted on a first channel in a signal received over a second channel. In one embodiment of the present invention, the synchronization code interference canceling receiver includes an RF-to-baseband converter operative to receive a radio frequency (RF) communications signal and operative to produce a baseband signal therefrom, and a synchronization code interference canceling baseband processor operative to cancel a component of the baseband signal associated with the synchronization code. The synchronization code interference canceling baseband processor may include a synchronization code interference signal generator circuit that generates an estimate of a component of the baseband signal associated with the synchronization code based on the synchronization code and a channel estimate, and a summing circuit operative to subtract the estimate of the component from the baseband signal to generate an interference-canceled version of the baseband signal. A demodulator may demodulate the interference-canceled version of the baseband signal to produce estimates of symbols originally transmitted on the second channel.

BRIEF DESCRIPTION OF THE DRAWINGS

FIG. 9 is a timing diagram illustrating exemplary physical channel configurations according to another embodiment of the present invention.

DETAILED DESCRIPTION

Figure 1:
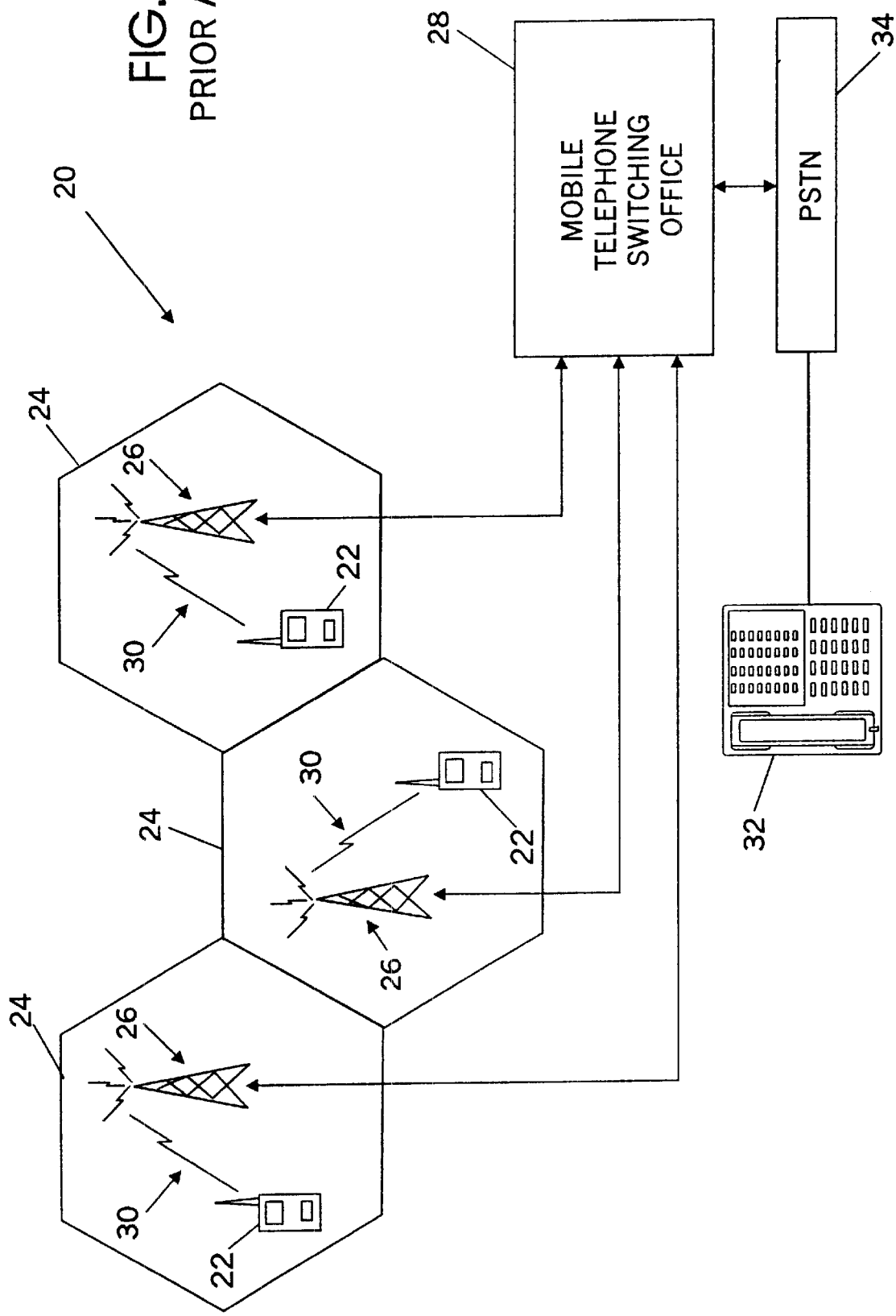
FIG. 1 is a schematic diagram illustrating a terrestrial wireless communications system according to the prior art.
Figure 2:
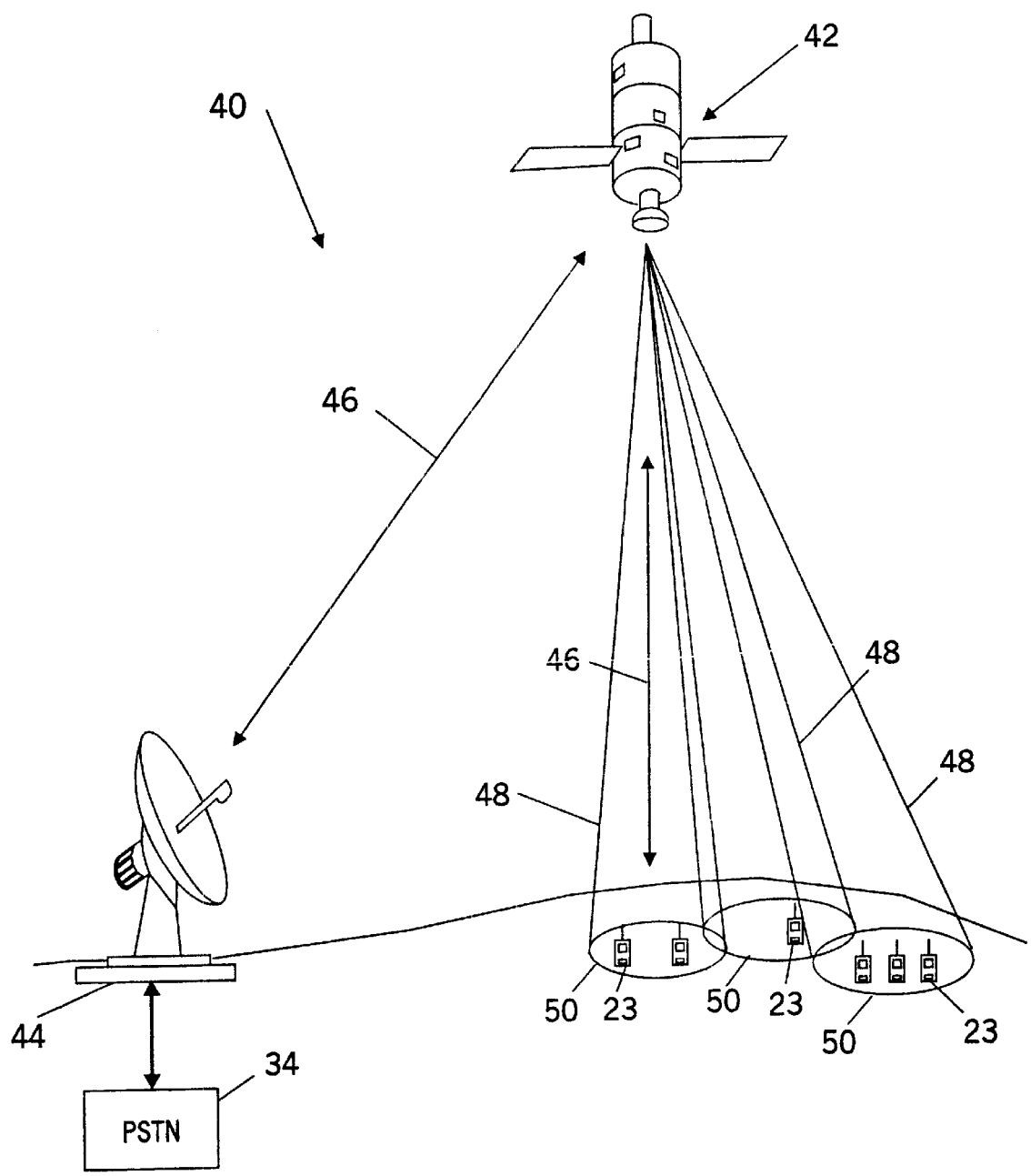
FIG. 2 is a schematic diagram illustrating a satellite wireless communications system according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. Although embodiments of the present invention described herein refer to forward link (downlink) channels for a wideband CDMA (WCDMA) system, it will be appreciated by those skilled in the art that the present invention is applicable to other communications systems.

Figure 3:
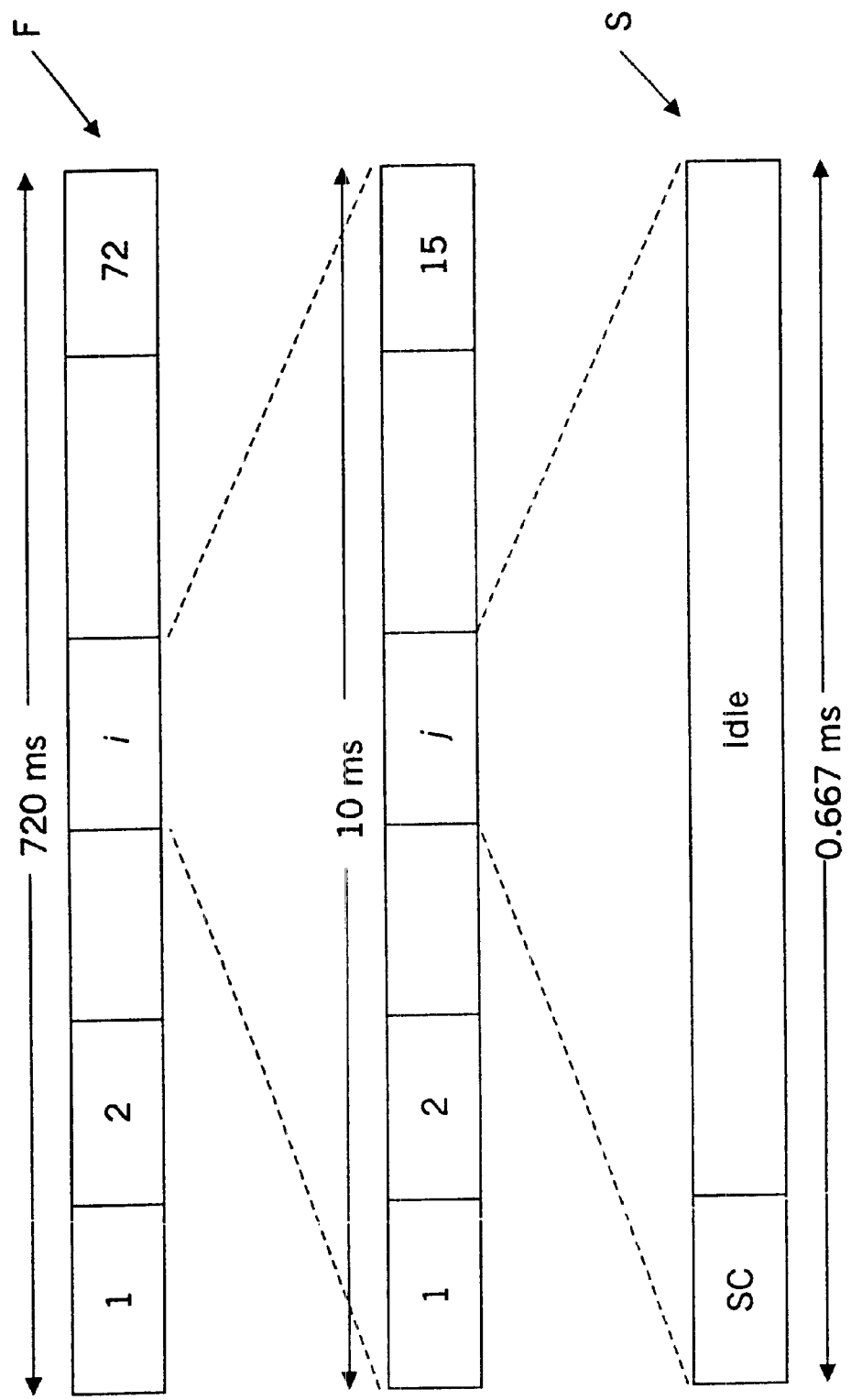
FIG. 3 is a diagram illustrating frame and slot structures for a synchronization channel (SCH) in a WCDMA system.
Figure 4:
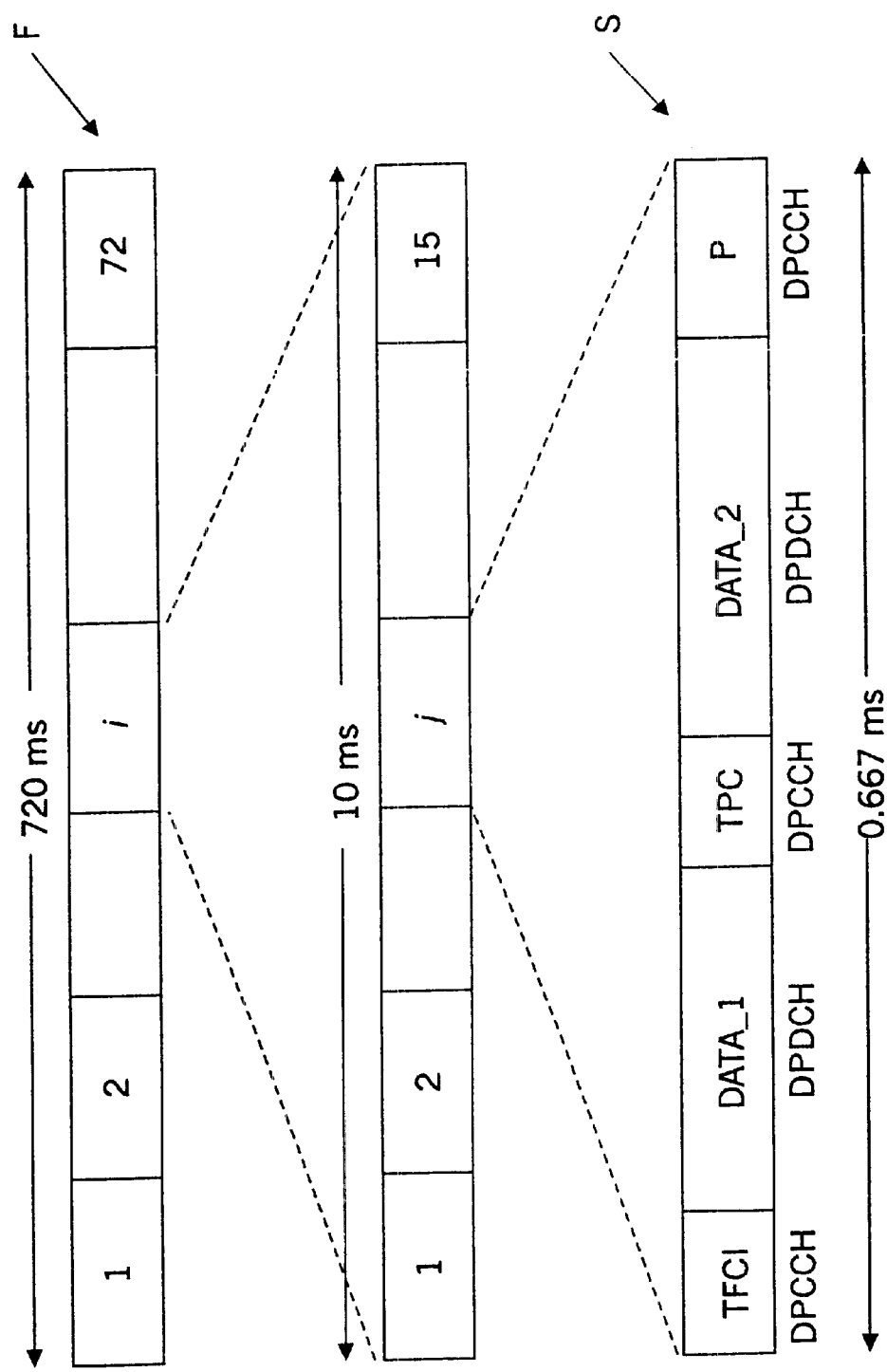
FIG. 4 is a diagram illustrating frame and slot structures for a dedicated physical channel in a WCDMA system.

FIG. 3 illustrates an exemplary synchronization channel (SCH) structure, and more particularly, an SCH structure utilized in WCDMA systems. A 720 millisecond (ms) frame F includes a series of 15 time slots S, each having a duration of 0.667 ms. Each of the time slots S includes a portion in which a synchronization code SC, e.g., a primary synchronization code (PSC) or a secondary synchronization code (SSC), is transmitted. As shown in FIG. 4, a typical dedicated downlink physical channel transmitted in parallel with the SCH of FIG. 3 includes a dedicated physical data channel DPDCH multiplexed with a dedicated physical control channel DPCCH. Each 0.667 ms slot S includes a transport format combination indicator TFCI, a transmit power control command TPC, and pilot symbols P of the DPCCH, along with data fields DATA_1, DATA_2 of the DPDCH.

Communication over the dedicated physical channel can be corrupted by interference from the synchronization code SC. Parts of the DPCCH that are particularly sensitive to interference by time-coincidence with the synchronization code SC include the pilot symbols P and the transport power control commands TPC, as these fields are typically not highly error-protected (e.g., by error-correction encoding). Errors in the pilot symbols P can result in erroneous channel estimates which can, in turn, lead to errors in demodulating the data fields DATA_1, DATA_2 of the DPDCH, especially for high-data rate channels for which the number of pilot symbols transmitted in a given time interval is relatively small in relation to the number of data symbols. Errors in the power control commands TPC can result in can result in degraded uplink performance, unnecessarily high terminal power consumption, and increased inter-user interference.

The data fields DATA_1, DATA_2 of the DPDCH and the transport format combination indicator TFCI of the DPCCH are generally not as vulnerable to interference from the synchronization code SC. Interference with the data fields DATA_1, DATA_2 may only produce higher error rates for a limited number of symbols, which may be correctable by error correction codes applied to these symbols. The transport format combination indicator TFCI typically is transmitted using a robust channel code, and thus is also generally less vulnerable to interference from the synchronization code SC.

It will be understood that the channel and slot formats of FIGS. 3 and 4 are offered for illustrative purposes, and reflect a current proposed standard for a WCDMA standard. It will be appreciated that the present invention may be used with other channel and slot formats used in other systems, including those utilized by later generation systems that represent modifications of the above-described channel and slot formats. It also will be appreciated that the present invention may be used to reduce interference in other channels than the dedicated downlink physical channel described with reference to FIG. 4.

Figure 5:
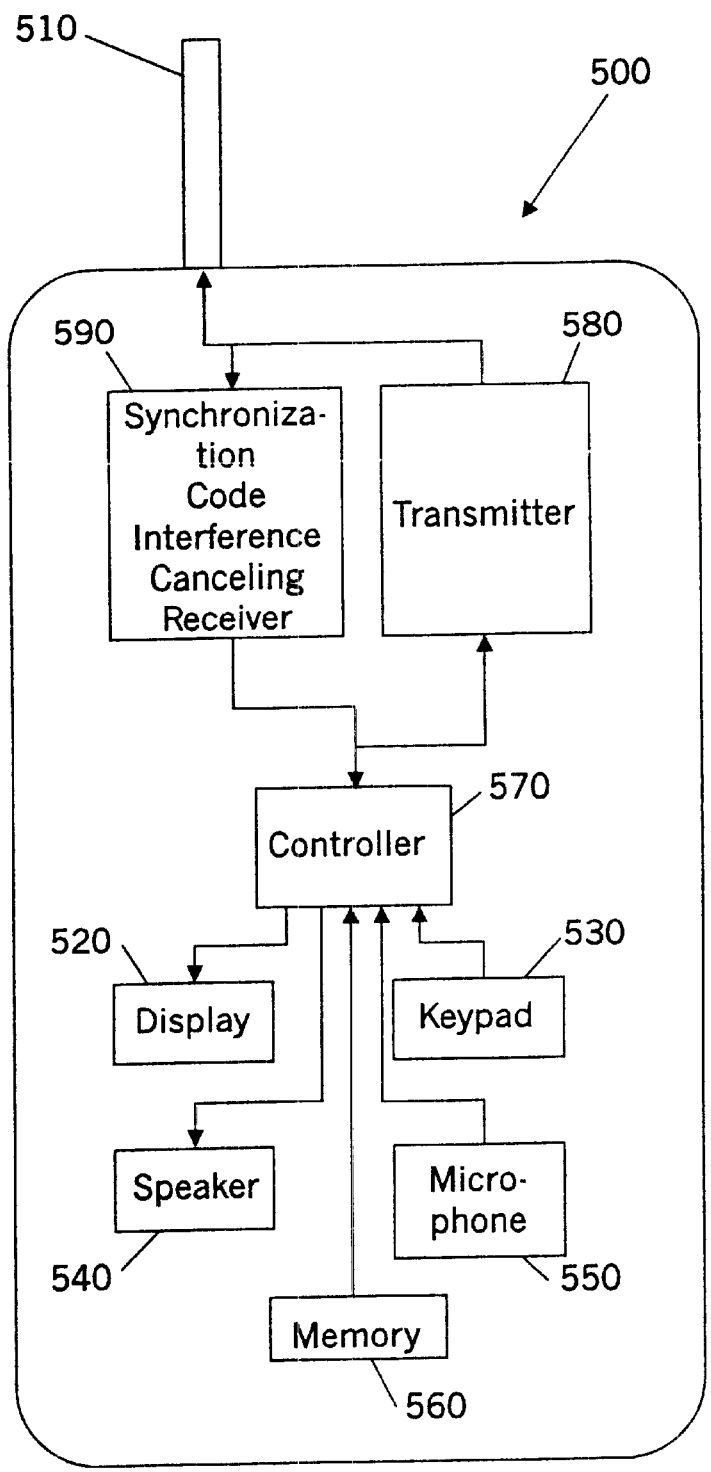
FIG. 5 is a schematic diagram of a wireless terminal according to an embodiment of the present invention.

FIG. 5 illustrates an exemplary wireless terminal 500, e.g., a terminal for use in a WCDMA communications system, which mitigates synchronization code interference using interference-cancellation techniques according to another aspect of the present invention. The terminal 500 includes a controller 570, such as a microprocessor, microcontroller or similar data processing device, that executes program instructions stored in a memory 560, such as a dynamic random access memory (DRAM), electrically erasable programmable read only memory (EEPROM) or other storage device. The controller 570 is operatively associated with user interface components such as a display 520, keypad 530, speaker 540, and microphone 550, operations of which are known to those of skill in the art and will not be further discussed herein. The controller 570 also controls and/or monitors operations of a radio transmitter 580 that, for example, transmits radio frequency (RF) signals in a communications medium via an antenna 510. The controller 570 is also operatively associated with a synchronization code interference canceling receiver 590. The synchronization code interference canceling receiver 590 is operative to cancel interference associated with a synchronization code transmitted on a first downlink channel from a received signal including information transmitted on a second downlink channel.

Figure 6:
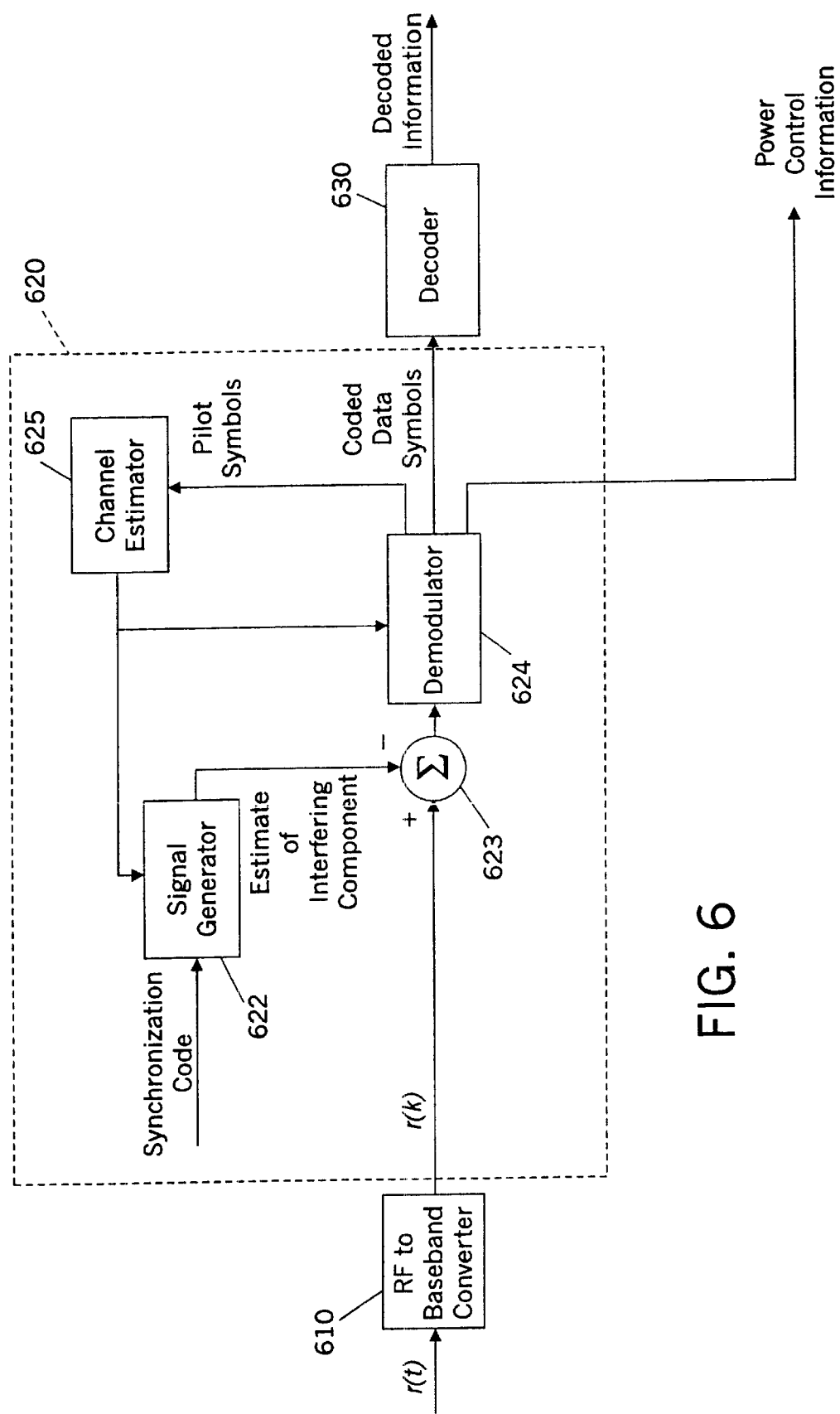
FIG. 6 is a schematic diagram of a synchronization code interference canceling receiver according to an embodiment of the present invention.

As illustrated in FIG. 6, the synchronization code interference canceling receiver 590 may include an RF-to-Baseband converter 610 that converts a radio frequency (RF) signal r(t) into a baseband signal r(k) which is processed by a synchronization code interference canceling baseband processor 620. In the synchronization code interference canceling baseband processor 620, a synchronization code interference signal generator circuit 622 generates an estimate of a component of the baseband signal r(k) that is associated with an interfering synchronization code, based on knowledge of the synchronization code, e.g., its structure and timing, and a channel estimate produced by a channel estimator 625. For example, the synchronization code interference signal generator circuit 622 may implement a synchronization code generator (not shown) that generates a local replica of the synchronization code, and a modulator (not shown) that modulates a known data stream (typically a constant ±1 symbol value) to produce a replica of the synchronization code as transmitted. The synchronization code interference signal generator circuit 622 may then apply a channel estimate to this replica to produce an estimate of the component of the baseband signal r(k) associated with the synchronization code.

This component is subtracted from the received signal r(k) by a summing circuit 623 to produce an interference canceled version of the received signal r(k). The interference-canceled version of the received signal r(k) is then demodulated by a demodulator 624, producing a demodulated output which may include pilot symbols corresponding to transmitted pilot symbols, coded data corresponding to transmitted data fields, and power control information. The demodulated pilot symbols may be passed on to the channel estimator 625 for use in generating channel estimates, using techniques known to those skilled in the art which will not be discussed in detail herein. The demodulated power control information may be passed on for use in controlling transmit power for an uplink channel used by the terminal 500. The demodulated coded data may be passed on for further decoding, e.g., convolutional or other error-correction decoding, in a decoder 630.

The decoder 630 may also be used to provide additional interference cancellation according to another embodiment of the present invention. Specifically, the decoder 630 may modify selected symbols provided by the demodulator 642 before decoding, based on knowledge of symbol positions with which interfering synchronization codes coincide. For example, a signal to noise ratio may be determined, and a selected symbol estimate corresponding to a synchronization code interference susceptible symbol position, may be modified accordingly. If the demodulator 642 produces "soft values," i.e., values that indicate a likelihood of a particular symbol having a particular value, the decoder 630 may modify (e.g., scale or zero) selected soft values based on the signal to noise ratio measurements before decoding.

It will be appreciated that the synchronization code interference canceling receiver 590 and other components of FIGS. 5–6 may be implemented using a variety of hardware and/or software. For example, portions of the synchronization code interference canceling receiver 590, including the synchronization code interference canceling baseband processor 620, may be implemented using special-purpose hardware, such as an application specific integrated circuit (ASIC) and programmable logic devices such as gate arrays, and/or software or firmware running on a general or special purpose computing circuit such as a microprocessor, microcontroller or digital signal processor (DSP). It also will be appreciated that, although functions of the synchronization code interference canceling receiver 590 may be integrated in a single device, such as a single ASIC, they may also be distributed among several devices.

Figure 7:
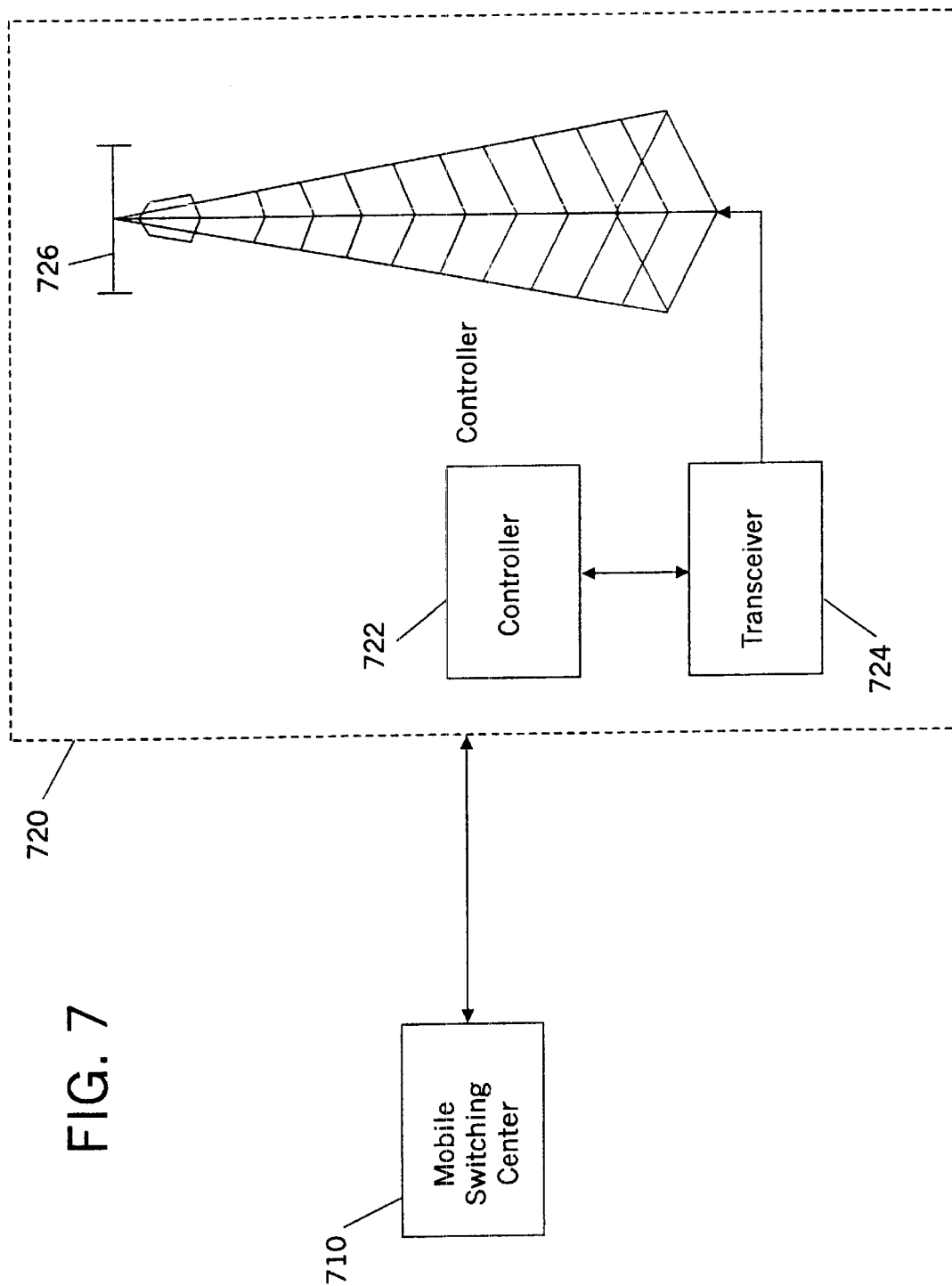
FIG. 7 is a schematic diagram of a wireless communications system according to an embodiment of the present invention.

FIG. 7 illustrates portions of a wireless communications system 700 in which another aspect of the present invention can be implemented. The wireless communications system 700 includes a base transceiver station (BTS) 720, which is operatively associated with a mobile switching center (MSC) 710. The BTS 720 includes a transceiver 724 that is operative to transmit and receive RF communications signals via an antenna 726. The BTS 720 also includes a controller 722 that is operative to control operations of the transceiver 724, typically under control instructions received from the MSC 710.

According to an embodiment of the present invention, the MSC 710 and/or the BTS 720 can reduce the effect of interference introduced by a synchronization code transmitted on one downlink channel in a signal transmitted on another downlink channel. More particularly, interference may be reduced by controlling the configuration and/or timing by which the other downlink channel is transmitted to reduce the likelihood of coincidence of sensitive information with synchronization codes.

Figure 8:
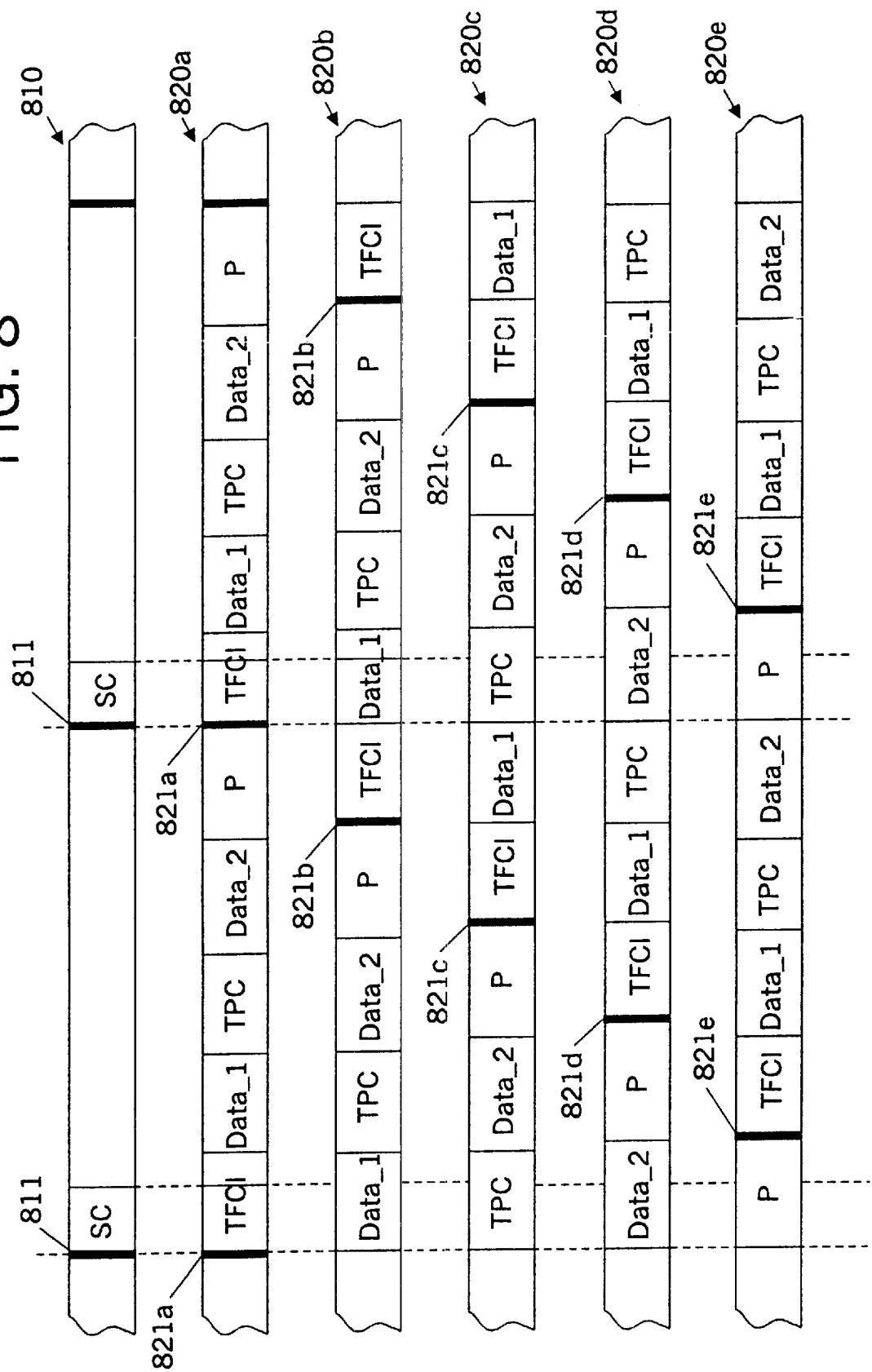
FIG. 8 is a diagram illustrating exemplary physical channel configurations according to an embodiment of the present invention.

In a typical WCDMA system, each BTS 720 is typically capable of transmitting dedicated physical channels (FIG. 4) with corresponding slot boundaries that are offset with respect to slot boundaries of the synchronization channel (FIG. 5), typically under control of the MSC 710. This is illustrated in FIG. 8, which shows possible dedicated physical channel configurations 820a, 820b, 820c, 820d, 820e for a spreading factor of 256, and corresponding slot boundaries 821a, 821b, 821c, 821d, 821e that are offset with respect to slot boundaries 811 of the synchronization channel 810. Using such offset slot boundaries, power commands TPC can be distributed, which can provide better signal power management.

According to one embodiment of the present invention, the dedicated physical channel configurations used by a BTS 720 are constrained to slot boundary offsets that avoid coincidence of synchronization codes SC with sensitive information transmitted on other channels, e.g., with transmit power control commands TPC and/or pilot symbols P transmitted on a dedicated physical channel. For the embodiment illustrated in FIG. 8, overlap of synchronization codes SC with transmit power control commands TPC may be avoided by utilizing physical channel configurations 820a, 820b, 820d, 820e and avoiding configuration 820c. Overlap with pilot symbols P may be avoided by using physical channel configurations 820a, 820b, 820c, 820d and avoiding configuration 820e. If avoidance of overlap with both the transport power control commands TPC and pilot symbols P is desired, the dedicated physical channels may be limited to configurations 820a, 820b, 820d. If the spreading factor is reduced, the number of possible configurations generally increases, thus potentially increasing the number of possible interference-avoiding dedicated physical channel configurations.

Although the approach described with reference to FIG. 8 may reduce interference from synchronization codes, constraining possible slot boundary offsets may result in less than optimum distribution of slot boundaries for purposes of signal power management. According to another embodiment of the present invention illustrated in FIG. 9, this effect can be mitigated by introducing a modified dedicated physical channel configurations 920a, 920b, 920c, 920d, 920e, which may be used instead of, or in addition to, the dedicated physical channel configurations 820a, 820b, 820c, 820d, 820e shown in FIG. 8. As shown in FIG. 9, overlap of synchronization codes SC with transport control power commands TPC may be avoided by using dedicated physical channel configurations 920a, 920b, 920c, 920e and avoiding use of configuration 920d. Overlap with the pilot symbols P may be avoided by using configurations 920a, 920b, 920c, 920d and avoiding configuration 920e. If avoidance of overlap with both the transport power control commands TPC and pilot symbols P is desired, the dedicated physical channels may be limited to configurations 920a, 920b, 920c. Multiple slot formats, e.g., both of the slot formats of FIGS. 8 and 9, may be concurrently used to increase the number of slot boundaries that can be employed to avoid synchronization code interference. A terminal may be informed as to which slot format to use, for example, in control information sent to the terminal from a base station at registration.

It will be appreciated that the interference-avoiding and canceling techniques described herein may be used alone or in combination. For example, a wireless communications system may employ the slot boundary offset constraints and/or multiple alternative slot configuration techniques described above. Such a system may be utilized by various wireless terminals that implement various ones of the terminal-based interference-avoiding techniques described above. For example, a population of terminals supported by the wireless communications system may include terminals that can utilize multiple slot configurations, as well as terminals that utilize only one slot configuration. The terminal population may also include terminals that have synchronization code interference canceling receivers, along with terminals that lack such a capability. The latter may choose to rely solely on the interference-avoiding capabilities provided by the system, e.g., constrained slot boundary offsets and/or multiple alternative slot configurations, to reduce synchronization code interference.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating in a code division multiple access (CDMA) communications system, the method comprising the steps of:
   transmitting a synchronization code on a first channel; and
   transmitting information of respective levels of sensitivity to interference on a second channel using a slot configuration that reduces the likelihood of time-coincidence of the synchronization code with first information transmitted on the second channel having a higher level of sensitivity to interference in comparison to second information transmitted on the second channel.

2. A method according to claim 1, wherein said step of transmitting information of respective levels of sensitivity to interference on a second channel using a slot configuration that reduces the likelihood of time-coincidence of the synchronization code with first information transmitted on the second channel having a higher level of sensitivity to interference in comparison to second information transmitted on the second channel comprises the step of transmitting on the second channel using a slot boundary offset that is selected to reduce the likelihood of time-coincidence of the synchronization code with the first information.

3. A method according to claim 1, wherein said step of transmitting on the second channel is preceded by the step of selecting the slot configuration from a plurality of possible slot configurations such that the likelihood of time-coincidence of the synchronization code with the first information is minimized.

4. A method according to claim 1, wherein the first information comprises information transmitted on the second channel with less error protection than the second information.

5. A method according to claim 1, wherein the first information comprises at least one of power control information or a pilot symbol.

6. A method according to claim 1, wherein the second channel comprises a dedicated physical channel.

7. A method according to claim 1, wherein the synchronization code comprises at least one of a primary synchronization code (PSC) and a secondary synchronization code (SSC).

8. A method of communicating in a code division multiple access (CDMA) communications system, the method comprising the steps of:
   transmitting a synchronization code on a first channel; and
   transmitting information on a second channel from a first entity;
   receiving a signal including the second channel at a second entity; and
   canceling interference associated with the synchronization code from the received signal to recover information originally transmitted on the second channel.

9. A method according to claim 8, wherein the first entity comprises a cellular base station and wherein the second entity comprises a terminal.

10. A method according to claim 8, wherein said step of canceling interference comprises the steps of:
    generate an estimate of a component of the received signal associated with the synchronization code based on a channel estimate and knowledge of the synchronization code;
    canceling the estimate of the component from the received signal to generate an interference-canceled version of the received signal; and processing the interference-canceled version of the received signal to recover information originally transmitted on the second channel.

11. A method of communicating in a code division multiple access (CDMA) communications system, the method comprising the steps of:
    transmitting a synchronization code on a first channel; and
    encoding information according to an error correction code to produce a series of encoded symbols;
    transmitting the encoded symbols on a second channel from a first station;
    receiving a signal including the second channel at a second entity;
    demodulating the received signal to recover a series of received symbols corresponding to the series of encoded symbols;
    modifying the series of received symbols to compensate for interference from the synchronization code; and
    decoding the modified series of received symbols.

12. A method according to claim 11, wherein said step of decoding is preceded by the step of determining a signal to noise ratio for the received signal, and wherein said step of modifying the series of received symbols based on the determined signal to noise ratio.

13. A code division multiple access (CDMA) communications system, comprising:
    a base transceiver station (BTS) operative to transmit a synchronization code on a first channel and to transmit information on a second channel using a slot configuration that reduces the likelihood of time-coincidence of the synchronization code with first information transmitted on the second channel having a higher level of sensitivity to interference in comparison to second information transmitted on the second channel.

14. A system according to claim 13, wherein the BTS is operative to transmit on a second channel using a slot boundary offset that reduces the likelihood of time-coincidence of the synchronization code with the first information.

15. A system according to claim 14, wherein the BTS is operative to transmit on the second channel using a slot configuration selected from a plurality of possible slot configurations to reduce the likelihood of time-coincidence of the synchronization code with the first information.

16. A system according to claim 13, wherein the first information comprises information that is less error-protected than the second information.

17. A system according to claim 13, wherein the information having a higher level of sensitivity to interference comprises at least one of power control information or a pilot symbol.

18. A system according to claim 13, wherein the second channel comprises a dedicated physical channel.

19. A system according to claim 13, wherein the synchronization code comprises at least one of a primary synchronization code (PSC) and a secondary synchronization code (SSC).

20. A code division multiple access (CDMA) terminal, comprising:

a synchronization code interference canceling receiver operative to cancel interference attributable to a synchronization code transmitted on a first channel in a signal received over a second channel, wherein the synchronization code interference canceling receiver comprises:

an RF-to-baseband converter operative to receive a radio frequency (RF) communications signal and operative to produce a baseband signal therefrom; and a synchronization code interference canceling baseband processor operative to cancel a component of the baseband signal associated with the synchronization code.

21. A terminal according to claim 20, wherein the synchronization code interference canceling baseband processor comprises:

a synchronization code interference signal generator circuit that generates an estimate of a component of the baseband signal associated with the synchronization code based on the synchronization code and a channel estimate;

a summing circuit operative to subtract the estimate of the component from the baseband signal to generate an interference-canceled version of the baseband signal; and a demodulator operative to demodulate the interference-canceled version of the baseband signal to produce estimates of symbols originally transmitted on the second channel.

22. A terminal according to claim 21, wherein the synchronization code interference canceling receiver further comprises a decoder responsive to the demodulator and operative to modify the estimates of symbols to compensate for interference from the transmitted synchronization code and to decode the modified estimates to recover information.

23. A terminal according to claim 20, wherein the second channel comprises a dedicated physical channel.

24. A terminal according to claim 20, wherein the synchronization code comprises at least one of a primary synchronization code (PSC) and a secondary synchronization code (SSC).

25. A receiver for recovering information from a received signal, comprising:

means for producing a baseband signal from the received signal;

means for generating an estimate of a component of the baseband signal associated with the synchronization code from the synchronization code and a channel estimate of a channel over which the received signal was received;

means, responsive to said means for generating an estimate of a component of the baseband signal associated with the synchronization code, for subtracting the estimate of the component from the baseband signal to generate an interference-canceled version of the baseband signal;

means, responsive to said means for subtracting, for demodulating the interference-canceled version of the baseband signal to produce estimates of symbols originally transmitted on the channel;

means, responsive to said means for demodulating, for modifying the estimates of symbols originally transmitted on the channel to compensate for interference from the synchronization code; and means, responsive to said means for modifying, for decoding the modified estimates of symbols to recover information.

26. A receiver for recovering information from a received signal, comprising:

means for producing a baseband signal from the received signal;

means for generating an estimate of a component of the baseband signal associated with the synchronization code from the synchronization code and a channel estimate of a channel over which the received signal was received;

means, responsive to said means for generating an estimate of a component of the baseband signal associated with the synchronization code, for subtracting the estimate of the component from the baseband signal to generate an interference-canceled version of the baseband signal;

means, responsive to said means for subtracting, for demodulating the interference-canceled version of the baseband signal to produce estimates of symbols originally transmitted on the channel, wherein the synchronization code comprises at least one of a primary synchronization code (PSC) and a secondary synchronization code (SSC).

27. A receiver according to claim 26, wherein the channel comprises a dedicated physical channel.

* * * * *